US006673736B2

(12) United States Patent
Kellum et al.

(10) Patent No.: US 6,673,736 B2
(45) Date of Patent: Jan. 6, 2004

(54) CHROMATE ESTER CATALYST AND METHOD OF USING SAME TO PRODUCE HIGH PERFORMANCE POLYETHYLENE PRODUCTS

(75) Inventors: Gene E. Kellum, Orange, TX (US); Pamela L. Maeger, Orange, TX (US)

(73) Assignee: Chevron Chemical Company LLC, San Francisco, CA (US)

( * ) Notice: Subject to any disclaimer, the term of this patent is extended or adjusted under 35 U.S.C. 154(b) by 0 days.

(21) Appl. No.: 09/485,609

(22) PCT Filed: Dec. 21, 1999

(86) PCT No.: PCT/US99/30594

§ 371 (c)(1),
(2), (4) Date: Feb. 11, 2000

(87) PCT Pub. No.: WO00/39173

PCT Pub. Date: Jul. 6, 2000

(65) Prior Publication Data

US 2003/0129341 A1 Jul. 10, 2003

Related U.S. Application Data

(63) Continuation of application No. 09/222,080, filed on Dec. 29, 1998, now abandoned.

(51) Int. Cl.[7] .................................................. B32B 1/08
(52) U.S. Cl. ...................... 502/152; 428/36.9; 502/171; 502/256
(58) Field of Search ................. 138/138; 428/35.7, 428/36.9; 252/182.14; 502/150, 152, 171, 240, 256

(56) References Cited

U.S. PATENT DOCUMENTS

| | | | |
|---|---|---|---|
| 3,324,095 A | 6/1967 | Carrick et al. | 260/88.2 |
| 3,324,101 A | 6/1967 | Baker et al. | 260/94.9 |
| 3,642,749 A | 2/1972 | Johnson et al. | 260/88.2 |
| 3,704,287 A | 11/1972 | Johnson | 260/94.9 |
| 4,065,612 A | * 12/1977 | Hamer et al. | 526/130 |
| 4,119,773 A | * 10/1978 | Speca | 526/130 |
| 4,876,320 A | 10/1989 | Fulks et al. | 526/62 |
| 5,137,994 A | * 8/1992 | Goode et al. | 526/75 |
| 5,473,027 A | 12/1995 | Bachelor et al. | 526/106 |
| 5,895,770 A | 4/1999 | Pullukat et al. | 502/103 |

FOREIGN PATENT DOCUMENTS

| | | | |
|---|---|---|---|
| CA | 1237212 | * | 5/1988 |
| JP | 57014633 A | * | 1/1982 |

OTHER PUBLICATIONS

McDaniel, M.P., Supported Chromium Catalysts for Ethylene Polymerization, Academic Press, 1985.

American Society for Testing and Materials—Standard Specification for Polyethylene Plastics Pipe and Fittings Material, Designation: D 3350–02, pp. 1–3 (May 2002).

American Society for Testing and Materials—Supplemental Requirements for Gas Pressure Pipe and Fittings Produced from Polyethylene (PE) Material, D 2513, p. 10 (May 2002).

CPChem Polyethylene Data Sheet—HiD® 9346 High Density Polyethylene Natural Pipe Resin (Jun. 2002).

Crosfield Product Date Sheet—EP10X Silica (Oct. 1992).

* cited by examiner

*Primary Examiner*—Sandra M. Nolan
(74) *Attorney, Agent, or Firm*—McDermott, Will & Emery

(57) ABSTRACT

An improved chromate catalyst on a highly porous silica support having high surface area and total pore volume, a method of using same to produce high performance polyethylene products, and the high performance polyethylene products, such as polyethylene pipe, produced thereby.

38 Claims, No Drawings

CHROMATE ESTER CATALYST AND METHOD OF USING SAME TO PRODUCE HIGH PERFORMANCE POLYETHYLENE PRODUCTS

CROSS REFERENCE TO RELATED APPLICATIONS

This application is a 35 USC 371 filing of PCT/US99/30594, filed Dec. 21, 1999, which is a continuation of U.S. Ser. No. 09/222,080, filed Dec. 29, 1998 now abandoned.

FIELD OF THE INVENTION

The present invention relates to an improved chromate ester catalyst, especially a bis (triphenylsilyl) chromate catalyst useful for the polymerization of ethylene, a method of using the improved catalysts to produce high performance polyethylene products, such as polyethylene pipe, and the high performance polyethylene products made using the method.

BACKGROUND OF THE INVENTION

The use of silyl chromate as a polymerization catalyst has been known in the art for many years. See, for example, U.S. Pat. No. 3,324,095 (Carrick et al.) and U.S. Pat. No. 3,324,101 (Baker et al.) which teach the use of a silyl chromate catalyst system for olefin polymerization. Furthermore, in U.S. Pat. No. 3,642,749 (Johnson) and U.S. Pat. No. 3,704,287 (Johnson et al.) teach silyl chromate catalyst systems and disclose the deposition of chromate ester or di-tertiary polyalicyclic catalyst on activated silica and treatment with selected organo-metallic reducing agents. However, recently chromate ester catalyst have fallen out of favor due to their limited effectiveness in polymerization processes when compared with newer catalysts, such as the new generation of catalysts used to make bi-modal polyethylene products. The present invention is directed to a new chromate ester catalyst that may be used to make very high performance polyethylene products; such as polyethylene pipe, polyethylene liner systems, and high molecular weight film. In a preferred embodiment of the invention the polyethylene product comprises a copolymer.

SUMMARY OF THE INVENTION

The present invention relates to a supported chromium containing catalyst which comprises (a) a highly porous silica support having a minimum surface area of at least about 300 $m^2/gr.$, an average pore volume of at least 2.0 cc/gr., and an average meso pore diameter of between about 350 A and 1000 A; and (b) a promoter comprising a chromate ester treated with a reducing agent. The catalyst of the present invention is particularly useful for the polymerization of mono unsaturated alpha-olefins having from two to eight carbon atoms in the molecule. The catalyst is especially useful for the polymerization of ethylene. The chromate ester present in the catalyst is usually a silyl ester compound such as bis (triphenylsilyl) chromate. Preferably the chromate ester will be present in an amount within the range of from about 0.15 weight percent to about 0.70 weight percent when calculated on the basis of elemental chromium metal, and more preferably will be present in an amount of between about 0.25 weight percent and 0.60 weight percent when calculated on the basis of elemental chromium metal and most preferably from about 0.45 weight percent to about 0.55 weight percent.

The support used in the catalyst of the present invention is a highly porous silica which comprises not less than about 93 weight percent silica. Preferably the support will consist essentially of silica with only traces other materials, such as impurities, present. The term "meso pore" refers to only those pores in the high silica support which have a diameter of between 20 A and 1000A. Pores present in the support smaller than 20A are referred to as micropores, while pores larger than 1000A are referred to as macropores. While not wishing to be bound by any particular theory, it is believed that the average size of the mesopores are critical to the present invention, since the mesopores are believed to be the primary sites were catalytic reactions, such as polymerization, occur in the finished catalyst. Likewise surface area and the average pore volume also have been shown to be critical limitations of the support used in the present invention. For the highly porous silica support, it is preferred that the surface area be at least 300 $m^2/gr.$, the average pore volume be within the range of from about 2.0 cc/gr. to about 4.0 cc/gr., and the mean meso pore diameter be within the range of from about 350 A and about 700A.

Average pore diameters given in this disclosure were measured by the adsorption isotherm method. Total pore volume may be determined by the amount of liquid nitrogen adsorbed at a partial pressure of or near 0.99. Surface area may be determined by the BET surface area method (ASTM D3663). One skilled in the art will recognize that the average pore diameter and pore volume may be somewhat different for the finished catalyst as compared to the support prior to addition of the promoter.

The present invention further relates to a continuous process for polymerizing ethylene which comprises contacting a reaction sysem comprising ethylene with a catalytic amount of a promoter comprising a chromate ester treated with a reducing agent, said promoter being deposited on a highly porous silica support having a minimum surface area of at least about 300 $m^2/gr.$, an average pore volume of at least about 2.0 cc/gr., and an average meso pore diameter of between about 350 A and 1000 A for a time and under process conditions selected to produce an extrudable polyethylene product. In carrying out the process of the present invention the reaction system may contain only ethylene as a reactant, but in one preferred embodiment of the invention, in addition to the ethylene, the reaction system may also contain from about 0.002 mole ratio to ethylene to about 0.020 mole ratio to ethylene of a mono unsaturated alpha-olefin having from three to eight carbon atoms in the molecule. Preferably the mono unsaturated alpha-olefin present in the reaction system will have from about four to six carbon atoms in the molecule. The process of the present invention is particularly useful in the manufacture of high performance polyethylene products, i.e., polyethylene exhibiting very high PENT, NCTL or other slow crack growth test values as compared to polyethylene products made using conventional chromate ester catalysts.

The present invention is further directed to a polyethylene product obtainable by a process which comprises contacting a feedstream containing ethylene with a catalytic amount of a promoter comprising a chromate ester treated with a reducing agent, said promoter being deposited on a highly porous silica support having a minimum surface area of at least about 300 $m^2/gr.$, an average pore volume of is at least about 2.0 cc/gr., and an average meso pore diameter of between about 350 A and 1000 A for a time and under process conditions selected to produce an extrudable polyethylene product. The polyethylene product may consist essentially of only ethylene homopolymer, i.e., a polymer resin containing only ethylene monomer, or the polyethylene product will preferably contain co-monomers such as other mono unsaturated olefins besides ethylene. Such co-monomers, if present will usually contain from three to eight carbon atoms in the molecule and more preferably will contain from about four to six carbon atoms in the molecule. Polyethylene products, such as polyethylene pipe, within the scope of the present invention have been demonstrated to have PENT values in excess of 1000 hours and even in excess of 2000 hours.

As used in this disclosure a polyethylene product refers to either a polyethylene resin made using the present invention, or a product formed, usually by extrusion, from the polyethylene resin. Thus as used herein the term "polyethylene product" may be used to refer to a polyethylene homopolymer resin, a polyethylene copolymer resin, or to manufactures made therefrom, such as, for example, polyethylene pipe, polyethylene liner systems, and high molecular weight film.

PENT values used in this disclosure refer to the Pennsylvania Notched Test (ASTM F1473) which measures slow crack growth in the products produced using the resin. PENT values for conventional polyethylene pipe typically fall within the range of 50 to 500 hours. High performance pipe made using bi-modal polyethylene resins typically exhibit PENT values of about 1000 hours. Thus it is particularly surprising that polyethylene pipe may be manufactured using the present invention with PENT values in excess of 1000 hours and even in excess of 2000 hours. In addition, polyethylene pipe made using the process of the present invention has been shown to have good tensile properties (ASTM D638) and superior melt strength (as shown by an internally developed method).

As used in this disclosure the words "comprises" or "comprising" is intended as an open-ended transition meaning the inclusion of the named elements, but not necessarily excluding other unnamed elements. The phrase "consists essentially of" or "consisting essentially of" is intended to mean the exclusion of other elements of any essential significance to the combination. The phrase "consisting of" is intended as a transition meaning the exclusion of all but the recited elements with the exception of only minor traces of impurities.

DETAILED DESCRIPTION OF THE INVENTION

When chromate esters, such as silyl chromate, are supported on a highly porous silica base as described herein, the resulting catalyst displays significantly greater total catalyst productivity than chromate ester catalysts previously known. Polymers produced with the catalysts of the present invention have been found to have outstanding properties when used in high performance polyethylene applications, such as polyethylene pipe. For example, PENT values for polyethylene pipe made using the process of the present invention have been shown to exceed 1000 hours. In addition, melt strength was also found to be extremely desirable being more than 30% greater than other high performance pipe resins. The properties of polyethylene pipe made using the present invention suggest that the improved polyethylene resins of the invention are at least equivalent to the new generation bi-modal products made with other catalysts and processes.

Silyl chromate catalysts made using the highly porous silica support of the present invention have demonstrated an increased total catalyst productivity that is equal to about twice that seen using conventional silyl chromate catalysts. Using the conventional silyl chromate catalysts productivity levels of around 3000 lb/lb of total catalyst are typical. In contrast, the improved process of the present invention has given productivity values as high as 6000 lb/lb of total catalyst. In addition, polyethylene pipe products made by the improved process have demonstrated PENT values in the 3000–4000 hour range while the pipe made using conventional processes typically yield PENT values of in the 50–500 hours range. The improved total catalyst productivity and pipe performance levels demonstrated using the present invention have not been observed using current processes.

Surprisingly, it has been found that the highly porous silica support allows effective loading of the chromate promoter at higher levels than conventional supports. While, it has been possible to load equivalent levels of chromate promoter on conventional supports, studies indicate that the higher levels of promoter do not improve total catalyst productivity of the process or produce a higher performance product. Thus the present invention represents a significant breakthrough in the manufacture of both high performance catalysts and high performance polyethylene products.

In carrying out the present invention the chromate esters used as a promoter may include any of the chromate esters which have been described in the literature as useful in the polymerization of ethylene. See, for example U.S. Pat. Nos. 3,324,101 and 3,704,287, the contents of which are herein incorporated by reference. Preferred promoters are silyl ester compounds having pendent hydrocarbyl groups of from one to about fourteen carbon atoms attached to the silicon atom of the molecule. Illustrative promoters within the scope of the broad invention include, but are not necessarily limited to bis (trimethylsilyl) chromate, bis (triethylsilyl) chromate, bis (tributylsilyl) chromate, bis (triisopentylsilyl) chromate, bis (tri-2-ethylhexylsilyl) chromate, bis (tridecylsilyl) chromate, bis (tri-tetradecylsilyl) chromate, bis (tribenzylsilyl) chromate, bis (triphenethylsilyl) chromate, bis (triphenylsilyl) chromate, bis (tritolylsilyl) chromate and the like. Especially preferred as a promoter is bis (triphenylsilyl) chromate.

In carrying out the present invention the amount of chromate ester present on the catalyst should be at least a catalytic amount, i.e., an effective amount sufficient to catalyze the polymerization reaction. Preferably, the amount of chromate ester should constitute at least about 0.15 wt % but could be as high as 0.70 wt % of the catalyst composition expressed as elemental chromium metal. More preferably, the amount of chromate ester should be within the rang of from about 0.25 weight % to about 0.60 weight percent expressed as chromium metal present and even more peferably within the range from about 0.45 to about 0.55 weight percent expressed a chromium metal present. As shown in the examples below, higher levels of chromate exhibited the best catalyst performance and resulted in polyethylene products having superior properties.

In preparing the catalysts of the present invention the chromate ester must be reduced with an organometallic reducing agent, such as, for example, one or more of a variety of alkyl aluminum compounds. Generally preferred in reducing the chromate promoter when carrying out the present invention is di-ethyl aluminum ethoxide. However, the reducing agent selected for preparing the catalyst may not be the most critical element of the invention, and the choice of reducing agent will often depend on other factors such as cost, availability, ease of handling, and stability. Such reducing agents are well known to those skilled in the art and should not require further elaboration here.

The highly porous silica support used to prepare the catalysts of the present invention should comprise at least about 93 weight percent silica. The support will generally consist essentially of only silica, except for non-essential impurities; however, other types of silicas containing other elements, such as titanium co-gels, could be expected to work in certain instances. The support should have a high surface area, preferably of at least about 300 m²/gr. and alternatively can have a surface area of at least about 450 m²gr. The average pore volume should be at least about 2.0 cc/gr. and more preferably will have an average pore volume of at least 3.0 cc/gr. The upper limit on pore volume does not appear to be critical to the invention, but usually the average pore volume of the support will not exceed about 4.0 cc/gr. The average meso pore diameter of the support should fall within the range of from about 350 A to about 1000 A as measured by the adsorption method. Generally, higher surface area and higher pore volume and a pore diameter falling in the lower part of the range are preferred.

At least one family of microspherical-type supports meeting the requirements of the invention is commercially available, and is produced by The PQ Corporation of Valley Forge, Pa. Two supports from this family have been used to carry out the process of the invention. Their designations are MS 3030 and MS 3050. The surface area of MS 3030 has been measured at 320 m²/gr. and the pore volume and average meso pore diameter have been measured as 2.95 cc/gr. and about 610A, respectively. The MS 3050 support has been found to have a surface area of 467 m²/gr., a total pore volume of 2.8 cc/gr., and an average meso pore diameter of about 400A. Although the two cited supports are of the microspheroidal type, silicas of a granular or spray-dried type are available and possess similar properties to the microsperoidal varieties. They would thus be expected to find application within the areas described herein.

In carrying out the invention, it may be advantageous to include between about 0.002 mole ratio to ethylene and about 0.030 mole ratio to ethylene of a co-monomer to ethylene in the reaction system. The co-monomer is typically a mono unsaturated alpha-olefin having from three to eight carbon atoms in the molecule. More preferably the co-monomer will have from four to six carbon atoms in the molecules. One skilled in that art will recognize that the reaction system may also contain a mixture of co-monomers, hydrogen, and inert materials, in which case the invention is not restricted to only the presence of a single monomer in addition to the ethylene. Co-monomers which may be included in the reaction system are, for example, propylene, 1-butene, 1-pentene, 3-methybutene, 1-hexene, 1(4-methylpentene), 1-heptene, 1-octene, and the like. Preferred for use as co-monomers with ethylene are 1-butene and 1-hexene, with 1-hexene being particularly preferred.

The polymerization reaction is preferably carried out in the gaseous phase, but the process may also be carried out as a slurry or solution polymerization. In gas phase polymerization, catalyst particles are fluidized by a continuous flow of gaseous mixture which also acts as a coolant. See U.S. Pat. Nos. 4,876,320 and 5,473,027 for a discussion of gas phase polymerization, the entire contents of which are incorporated herein by reference. The polymerization process may be conducted over a wide range of temperatures and pressures, but usually the polymerization reaction is conducted at a temperature of between about 40 degrees C. and about 200 degrees C. and within a pressure range of from about 20 psig to about 600 psig. The polymerization process may also be used in high condensation and high productivity mode. When the process is conducted as a gas phase polymerization, the reaction is preferably conducted at a temperature of between about 90 degrees C. and about 110 degrees C. and within a pressure range of from about 150 psig and about 450 psig.

The invention will be further illustrated by the following examples, which set forth preferred embodiments of the invention and compare the performance of the improved catalysts of the invention to conventional catalysts. While the Examples are provided to illustrate the present invention, they are not intended to limit it.

EXAMPLE 1

The performance of three different catalysts using conventional supports were compared to two catalysts prepared using MS 3030 and MS 3050 as the supports in a continuous gas phase system. Table 1 below shows a comparison of total catalyst productivity, i.e., pounds of polyethylene per pound of total catalyst, and PENT results.

The first entry in the table represents a conventional catalyst using Crosfield EP10X as a support. This silica support may be described as having medium surface area and medium pore volume. Catalysts of this type have been used commercially to manufacture polyethylene pipe for many years. It should be noted that increasing the loading of chromium on the support was not effective in increasing either total catalyst productivity within the process or the performance of the resulting product.

A second catalyst tested was prepared from Crosfield EP50 base. This support has a high surface area and is described by the manufacturer as a titanium modified cogel. Table 1 shows that the total catalyst productivity of EP50 did not improve with increased chromium loading. However, some improvement in PENT values were observed.

The third catalyst in the Table used a base produced by Grace Davison designated SMR 49. High chromium loading gave improved total catalyst productivity. Unfortunately, PENT results on the polymer were only slightly improved over those obtained from the standard EP10X base.

The fourth catalyst in Table 1 was prepared using MS 3030. This catalyst which is an embodiment of the invention is shown with high chromium loading. The high chromium catalyst exhibited very good total catalyst productivity and PENT values were exceptional. The PENT failure for product made with this catalyst was recorded at 6000 hours. As noted above this support has a surface area in the lower end of the range for the present invention, but it does have very large diameter meso pores and a high pore volume.

The final catalyst tested was prepared using MS 3050 as a support. Again the performance of the catalyst was tested at both high and low levels of chromium loadings. The high chromium version of the catalyst had excellent total catalyst productivity and displayed superior PENT values. Some of the butene copolymers gave PENT values in excess of 1700 hours.

TABLE 1

Comparison of Catalyst and Pipe Performance Properties

| Catalyst Base (comonomer) | Chromium Level | Total Catalyst Productivity lb. PE/lb. total Catalyst | PENT Test Results, hrs[1] | Surface Area m²/g | Pore Volume cc/g Silica |
|---|---|---|---|---|---|
| Crosfield EP10X (1-butene) | Low | 2700 | 60–90 | 290–370 | 1.8 |
| Crosfield | High | 2300 | 60–90 | 290– | 1.8 |

TABLE 1-continued

Comparison of Catalyst and Pipe Performance Properties

| Catalyst Base (comonomer) | Chromium Level | Total Catalyst Productivity lb. PE/lb. total Catalyst | PENT Test Results, hrs[1] | Surface Area m²/g | Pore Volume cc/g Silica |
|---|---|---|---|---|---|
| EP10X (1-butene) | | | | 370 | |
| Crosfield EP10X (1-hexene) | Low | 3100 | 300–400 | 290–370 | 1.8 |
| Crosfield EP50 (1-butene) | Low | 3100 | >500 | 440–540 | 2.2 |
| Crosfield EPS0 (1-butene) | High | 2900 | >700 | 440–540 | 2.2 |
| Davison SMR 49 (1-butene) | High | 4350 | 135 | 500 | 2.6 |
| PQ MS 3030 (1-butene) | High | 3000 | 6000 | 300 | 3.0 |
| PQ MS 3050 (1-hexene) | Low | 3360 | >1200 | 500 | 3.0 |
| PQ MS 3050 (1-hexene) | High | 5920 | >3500 | 500 | 3.0 |
| PQ MS 3050 (1-butene) | High | 5700 | >1700 | 500 | 3.0 |

EXAMPLE 2

Comparative data shown in Table 2 was obtained for various properties of polyethylene pipe resins produced using the catalyst of the present invention in a continuous gas phase system and for polyethylene pipe resins made using a conventional catalyst. Specifically, the data shown in Table 2 was obtained for standard gas phase butene based pipe grade HiD 9346 (referred in the table as HiD 9346 B) which was made with a catalyst using EP10 catalyst base, LX4838 (1-hexene comonomer) which was made with a catalyst using MS 3050 catalyst base (bis(triphenyl silyl chromate) catalyst), and HiD 9346 commercially prepared resin using MS 3050 and 1-hexene. (The hexene version of HiD 9346 is referred to in the table as HiD 9346H.)

The most obvious difference between the pipe resins is in the PENT data. The PENT (Pennsylvania Notched Test, ASTM F1473) test assesses slow crack growth for pipe resins. The PENT values for LX4838 exceed 3100 hours with no failures. HiD 9346 B (1-butene, EP10) failed PENT at 60 hours which is typical for pipe manufactured using conventional catalyst. Commercially prepared HiD 9346H with 1-hexene and MS 3050 has PENT values in excess of 2700 hours with no failures. Typical PENT values for PE3408 type pipe grades (such as HiD 9346B) are in the 50–500 hour range. The highest PENT values for commercially available PE3408 pipe grades have been for bi-modal resins such as Fina 3344. Fina 3344 has PENT values typically in the 1000 hour range. LX4838 and commercial HiD 9346H (1-hexene, MS 3050) have far superior PENT values.

For the molecular weight data shown (GPC), LX4838 and HiD 9346H are as broad in molecular weight distribution (Mw/Mn value) as HiD 9346 B. This means that LX4838 and HiD 9346H have excellent processability into pipe. There is also higher Mz (high molecular weight tail) values for LX4838 and HiD 9346H versus HiD 9346 B. This means that LX4838 and HiD 9346H

TABLE 2

Gas Phase Pipe Resins - MS3050 vs. EP10

| Property | HiD 9346B | LX4838A | LX4838B | HiD 9346H |
|---|---|---|---|---|
| Density, gm/cc | 0.9456 | 0.9456 | 0.9456 | 0.945 |
| Melt Index 5, gm/10 min. | 0.29 | 0.30 | 0.26 | 0.30 |
| HLMI, gm/10 min. | 9.0 | 9.4 | 8.5 | 9.0 |
| MFR | 31 | 31 | 33 | 30 |
| PENT, hrs. | 60 | >3,100 | >3,100 | >2,700 |
| Tensile Strength at Yield, psi | 3,190 | 3,210 | 3,300 | 3,530 |
| Tensile Strength at Break, psi | 4,660 | 4,030 | 5,220 | 5,400 |
| Elongation, % | 800 | 690 | 760 | 830 |
| Charpy Impact, ft-lbs/in | 4.5 | 9.0 | 8.5 | 5.0 |
| Melt Strength at 190° C., gms | 24 | 21 | 18 | 21 |
| Melt Strength at 230° C., gms | 14 | 12 | 15 | 12 |
| Rheotens Tensile Force at Break, cN | 38 | 90 | 89 | N/A |
| OIT, minutes | 50 | 55 | 65 | 75 |
| Thermal Stability, C. | 265 | 265 | 265 | 265 |
| Mn (GPC) | 15,700 | 12,700 | 13,100 | 13,100 |
| Mw (GPC) | 208,400 | 226,200 | 228,600 | 253,000 |
| Mz (GPC) | 1,144,400 | 1,196,700 | 1,195,100 | 1,744,300 |
| Mw/Mn (GPC) | 13 | 18 | 18 | 19 |
| % <10$^4$ (GPC) | 14 | 17 | 17 | 15 |
| % <10$^6$ (GPC) | 5 | 6 | 6 | 6 |
| Catalyst Base | EP10X | MS3050 | MS3050 | MS3050 |
| Comonomer Type | 1-butene | 1-hexene | 1-hexene | 1-hexene |

What is claimed is:

1. A polyethylene product having a PENT value of at least 1000 hours obtainable by a process which comprises contacting a reaction system containing ethylene with a catalytic amount of a single catalyst produced by reacting a promoter comprising a silyl chromate ester with a reducing agent, said promoter being deposited on a highly porous silica support having a minimum surface area of at least about 300 $m^2$ gm, an average pore volume of at least about 2.0 cc/gm, and an average meso pore diameter of between about 350 Å and 1000 Å for a time and under process conditions selected to produce the polyethylene product.

2. An extruded polyethylene pipe product made using the polyethylene product of claim 1.

3. The polyethylene product of claim 1, wherein the reaction system also contains co-monomer comprising at least one mono-unsaturated alpha-olefin having from three to eight carbon atoms in the molecule.

4. The polyethylene product of claim 3, wherein the co-monomer comprises a mono-unsaturated alpha-olefin having from four to six carbon atoms in the molecule.

5. The polyethylene product of claim 4 wherein the co-monomer is 1-butene.

6. The polyethylene product of claim 4 wherein the co-monomer is 1-hexene.

7. The polyethylene product of claim 4 capable of being extruded into a pipe having a PENT value of at least 2000 hours.

8. An extruded polyethylene pipe product made using the polyethylene product of claim 7.

9. The polyethylene product of claim 6 capable of being extruded into a pipe having a PENT value of at least 3000 hours.

10. An extruded polyethylene pipe product made using the polyethylene product of claim 9.

11. A process for polymerizing ethylene which comprises a reaction system comprising ethylene with a catalytic amount of a single catalyst resulting from the reaction of a promoter comprising a silyl chromate ester with a reducing agent, said promoter being deposited on a highly porous silica support having a minimum surface area of at least about 300 $m^2$/gm, an average pore volume of at least about 2.0 cc/gm, and an average meso pore diameter of between about 350 Å and 1000 Å for a time and under process conditions selected to produce the polyethylene product having a PENT value of at least 1000 hours.

12. The process of claim 11 wherein the chromate ester on the catalyst is present in an amount of at least 0.15 and as much as 0.70 weight percent calculated on the basis of elemental metal.

13. The process of claim 11 wherein the silyl chromate ester is bis(triphenyl silyl) chromate.

14. The process of claim 11 wherein the highly porous silica support on the catalyst consists essentially of silica.

15. The process of claim 14 wherein the surface area of the highly porous silica support is at least 450 $m^2$/gm.

16. The process of claim 14 wherein the mean meso pore diameter of the highly porous silica support is between about 350A and about 700A.

17. The process of claim 14 wherein the average pore volume of the highly porous silica support is within the range of from about 2.0 cc/gm and about 4 cc/gm.

18. The process of claim 14 wherein the surface area of the highly porous silica support is at least 450 $m^2$/gm, the average pore volume is within the range of from about 2.8 cc/gm and about 3.5 cc/gm and the average meso pore diameter is in the range of from about 375 Å to about 425 Å.

19. The process of claim 11 wherein the reaction system also contains a co-monomer comprising at least one mono-unsaturated alpha-olefin having from three to eight carbon atoms in the molecule.

20. The process of claim 19 wherein the co-monomer comprises a mono-unsaturated olefin having from four to six carbon atoms in the molecule.

21. The process of claim 19 wherein the co-monomer comprises between about 0.002 mole ratio to ethylene and about 0.30 mole ratio to ethylene.

22. The process of claim 20 wherein the reaction system contains 1-butene.

23. The process of claim 20 wherein the reaction system contains 1-hexene.

24. The process of claim 11 wherein the polymerization is carried out as a gas phase polymerization.

25. A process for producing a polyethylene product having a PENT value of at least 1000 hours comprising contacting ethylene and at least one comonomer selected from mono unsaturated alpha-olefins having from three to eight carbon atoms per molecule under suitable polymerization conditions with a single catalyst system prepared by combining a silyl chromate ester and a highly porous support consisting essentially of silica which has a minimum surface area of at least 300 $m^2$/gm, an average pore volume of at least 2.0 cc/gm, an average meso pore diameter of between about 350 Å and 1000 Å and an organometallic reducing agent.

26. A process according to claim 25 wherein the silyl ester is a tri hydrocarbyl silyl ester in which each hydrocarbyl group can be the same or different and is selected from hydrocarbyl groups having 1 to 14 carbon atoms.

27. A process according to claim 26 wherein the organometallic reducing agent is an alkyl aluminum compound.

28. A process according to claim 27 wherein the chromate ester is bis(triphenyl silyl) chromate.

29. A process according to claim 28 wherein the reducing agent is an alkyl aluminum alkoxide.

30. A process according to claim 28 wherein the reducing agent is diethyl aluminum ethoxide.

31. A process according to claim 26 wherein the reducing agent is diethyl aluminum ethoxide.

32. A process according to claim 26 wherein the silyl ester is bis(triphenyl silyl) chromate.

33. A process according to claim 30 wherein the silica support has a surface area greater than 400 $m^2$/gm.

34. A process according to claim 30 wherein the silica support has a surface area of at least about 500 $m^2$/gm.

35. A process according to claim 25 wherein the silica has a surface area of greater than 400 $m^2$/gm.

36. A process according to claim 35 wherein the silyl chromate ester is bis(triphenyl silyl) chromate.

37. A process according to claim 30 wherein ethylene is copolymerized with 1-butene.

38. A process according to claim 30 wherein ethylene is copolymerized with 1-hexene.

* * * * *